Patented Mar. 3, 1936

2,032,988

UNITED STATES PATENT OFFICE 2,032,988

LOOP SYSTEM INDICATING DEVICE FOR AIRCRAFT

Lawrence A. Hyland and Carlos B. Mirick, Washington, D. C.

Application April 30, 1932, Serial No. 608,474

3 Claims. (Cl. 177—352)

(Filed but not issued under the act of March 3, 1883, as amended April 30, 1928; 370 O. G. 757)

This invention relates to a device for visually indicating the bearings obtained from a loop antenna on aircraft in flight, and more particularly to a device for conveying the directional information to the pilot in the simplest possible manner.

One of the objects of this invention is to provide a radio controlled visual indicating device adjacent the pilot of an aircraft that indicates by the position of a pointer whether the craft is on or off its course.

Another object of this invention is to provide a manually controlled indicating device by means of which a radio operator may direct the pilot of a craft by means of signal lamps when the received radio signals are too weak to operate the automatic indicator.

Another object of this invention is to provide an improved switching device whereby the radio operator may readily switch from automatic signals to manual signals and control the manual signals by means of a simple switching device.

Other and further objects of this invention will be understood from the specification hereinafter following by reference to the accompanying drawing.

The pilot of any aircraft in flight has many duties to perform and any efforts toward a simplification of his duties means that his efficiency as a pilot is increased. One of the important problems of airplane pilots is the directing of aircraft toward a landing field or a landing station when beset by fog or inclement weather, or when operating over territory where no land-marks are visible. In certain locations where the Department of Commerce beacon systems are available as on fixed air-mail routes, a radio beacon system has been worked out which makes the homing of aircraft a comparatively simple matter. Where these beacons are not installed or when flying from an aircraft carrier, some other means of homing is required. Fixed wing loops have been installed on aircraft and a system by which the balancing out of antenna effects is made possible has been developed but the solution of the remaining problem, that of conveying the directional information to the pilot in the simplest possible manner, is disclosed in this application. In this particular solution, which is based on the carrying of a radio operator such as is commonly done on military aircraft, the pilot is provided with the visual indicating device while the radio operator monitors the received signals.

In the drawing:

Fig. 1 is a circuit diagram of the indicating device;

Fig. 2 is a diagram showing the indicating device connected to the loop receiver.

Fig. 3 is a detail view showing the 3-position switch 12.

In Fig. 1, leads 1 and 2 are connected to the output of a radio receiver. Shunted across these leads are the phones 3. A switch 4 is adapted to be closed to connect the indicating system proper to the leads 1 and 2 from the receiver. From the switch 4, lead 5 is connected to the cathode of the rectifier tube 9 which serves to convert the alternating current of the receiver into direct current for actuating the meter 11. The lead 6 is connected from the other pole of the switch 4 to one of the contacts of switch 12. The lead 10 serves to connect the anode of the rectifier tube 9 to the meter 11, while the lead 14 completes the circuit of the meter back to the switch 12. A battery 7 and rheostat 8 are connected in the cathode circuit of the rectifier tube 9. The meter 11 with the switch 12 in the position shown is connected through the rectifier to the leads 1 and 2 from the receiver by the following circuit: Lead 1, switch 4, lead 6, lower left contact of switch 12, jumper 13, lead 14, meter 11, lead 10, rectifier tube 9, lead 5, switch 4 to lead 2.

Where the signals are too weak for meter operation, the directional information is conveyed through the medium of the lights at 20 and 21. In this case, the switch 4 may be opened so that the full strength of the signals is available across the phones. The radio operator then directs a line of flight of the plane and through the use of the phones can receive directional information for distances greatly in excess of those possible by the meter method. When he desires the plane to turn to the right, he presses switch 12 in the right-hand position, thus placing battery 18 in circuit with the green lamp 21. If he desires the plane to move to the left, he throws switch 12 to the left-hand position which connects the battery 18 in circuit with red lamp 20. If the signals become strong enough, the operator moves the switch 12 to the mid position and closes switch 4 if it is in the open position. The pilot is then enabled to steer the plane through the motion of the needle on the meter 11.

The switch 12 serves to open and close a circuit connecting the radio receiver to the meter 11 and to open and close the circuit of the lamps 20 and 21. With the switch 12 in the right-hand position, only the lamp 21 is energized. With the switch in the left-hand position, only the lamp 20 is energized. With the switch in the mid-position, neither of the lamps is energized but the meter 11 is then connected up through the rectifier 9 to the receiver. It is to be noted that the circuit to the meter 11 may be opened at either switch 4 or at switch 12. However, the switch 12 is used when it is desired to open the meter circuit and at the same time close a circuit for lamp 20 or 21. Switch 4 is opened when it is not desired to energize either lamp 20 or 21 and yet it is desirable to remove the meter from in shunt with the phones 3 in order to increase the sensitivity of the phones.

Fig. 2 shows diagrammatically the complete system in which 22 is the directional loop, 23 is the receiver connected thereto, 24 is the switching device, while 25 is the indicator board. The wing loop 22 is wound in the usual manner so that the plane formed by the loop is perpendicular to the axis of the fuselage in which case the meter 11 will read zero when the plane is heading toward or away from the transmitting station. If, however, the plane is at some angular position with respect to the line connecting the plane and the station transmitting the signals, the meter will read some value in excess of zero, the value being at a maximum when the plane is broadside to the transmitting station. This scheme as outlined with the meter alone has a disadvantage in that, when used without a radio operator monitor, the pilot is unaware when the signals have stopped or when some station other than the one he desires is also transmitting signals. It is therefore necessary that the directional indications be monitored by a radio operator who in this case wears the phones shown at 3. The lamps are sufficient for control at extreme distances where slight errors are of little moment in achieving the general directions to the station of transmission. When, however, the plane approaches the landing field and requires the most accurate bearings, the meter 11 enables the pilot to fly closer than within one degree of his course.

It will be understood that the above description and accompanying drawing comprehend only the general and preferred embodiment of our invention, and that various changes in construction, proportion and arrangement of parts may be made within the scope of the appended claims without sacrificing any of the advantages of this invention.

The invention herein described may be manufactured and used by or for the Government of the United States of America for governmental purposes without the payment to us of any royalties thereon.

We claim:

1. Means for visually indicating the bearing of an aircraft with respect to a radio transmitting station, comprising a loop fixedly mounted on said aircraft, a radio receiver adapted to receive from said transmtting station, means for connecting said loop to said receiver, a visual indicating device, auxiliary indicating devices, a switching device adapted to be shifted manually to either of three positions, a source of potential, means for connecting the visual indicating device to the output of the receiver when the switching device is in one position, means for disconnecting the receiver from the visual indicating device, and connecting said source of potential to energize one or the other of the auxiliary indicating devices when the switching device is in either of the other positions.

2. In combination, a mobile craft, a directional antenna mounted on said craft, a radio receiver connected to said antenna, a visual indicating meter connecting means whereby said meter is normally connected to be energized by the output of said receiver, a pair of auxiliary indicating lamps, a source of potential, and a switching device which may be shifted manually to any one of three positions and connections for connecting said receiver to said meter in one position of said switch or for connecting one or the other of said indicating lamps to said source of potential in the other positions.

3. In combination, a loop antenna, a radio receiver connected thereto, a visual indicating device, means for connecting the visual indicating device to the output of said receiver, a pair of auxiliary indicating devices, means for operating either of said auxiliary indicating devices, and means for opening the connection to said visual indicating device when either of said auxiliary indicating devices are being operated.

LAWRENCE A. HYLAND.
CARLOS B. MIRICK.

CERTIFICATE OF CORRECTION.

Patent No. 2,032,988.   March 3, 1936.

LAWRENCE A. HYLAND, ET AL.

It is hereby certified that error appears in the above numbered patent requiring correction as follows: In the drawing figure 3 as shown below should appear as part of the patent;

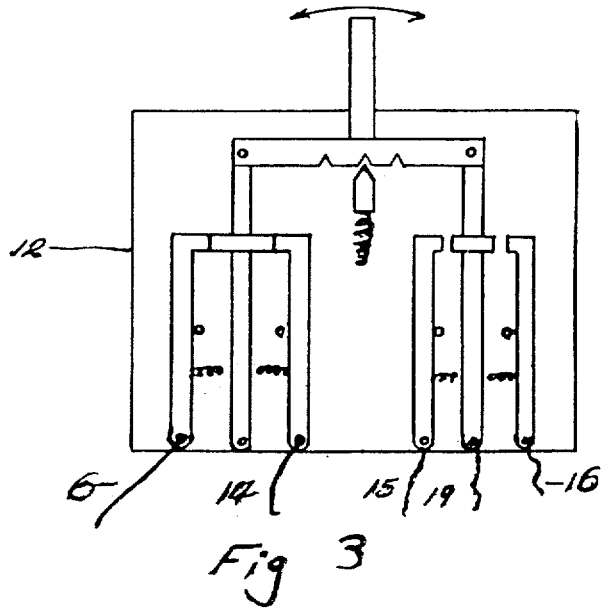

and that the said Letters Patent should be read with this correction therein that the same may conform to the record of the case in the Patent Office.

Signed and sealed this 21st day of April, A. D. 1936.

Leslie Frazer (Seal) Acting Commissioner of Patents.